United States Patent [19]

Schuss

[11] Patent Number: 4,672,530
[45] Date of Patent: Jun. 9, 1987

[54] DISTRIBUTED CONTROL WITH UNIVERSAL PROGRAM

[75] Inventor: Jack A. Schuss, West Hartford, Conn.

[73] Assignee: Combustion Engineering, Inc., Windsor, Conn.

[21] Appl. No.: 682,383

[22] Filed: Dec. 17, 1984

[51] Int. Cl.[4] ............... G05B 15/08; G05B 19/18
[52] U.S. Cl. ............................ 364/133; 364/131; 364/186; 364/187; 364/900; 371/9
[58] Field of Search ............................ 364/130–134, 364/184, 186, 187, 200 MS, 900 MS; 371/9

[56] References Cited

U.S. PATENT DOCUMENTS

| | | | |
|---|---|---|---|
| 3,444,528 | 5/1969 | Lovell et al. | 364/200 |
| 3,593,307 | 7/1971 | Gonge, Jr. et al. | 364/187 |
| 3,636,331 | 1/1972 | Annrehn | 371/9 |
| 3,783,250 | 1/1974 | Fletcher et al. | 371/9 |
| 4,015,548 | 4/1977 | Schuss | 364/132 |
| 4,141,066 | 2/1979 | Keiles | 371/9 |
| 4,200,226 | 4/1980 | Piras | 371/9 |
| 4,217,486 | 8/1980 | Tawfik et al. | 364/133 |
| 4,351,023 | 9/1982 | Richer | 364/134 |
| 4,363,093 | 12/1982 | Davis et al. | 364/200 |
| 4,412,281 | 10/1983 | Works | 364/200 |
| 4,542,479 | 9/1985 | Kamimura et al. | 364/187 |
| 4,610,013 | 9/1986 | Long et al. | 371/9 |

Primary Examiner—Jerry Smith
Assistant Examiner—John R. Lastova
Attorney, Agent, or Firm—Arthur E. Fournier, Jr.

[57] ABSTRACT

A distributed control system controlling a plurality of subprocesses wherein each of the process control computers (44, 46, 48) executes a preprogrammed set of instructions (50–62) identical to the preprogrammed set of instructions (50–62) in the other process control computers (44, 46, 48) in the distributed control system. Inputs from field devices (76, 78, 80) are connected between each subprocess and the process control computer (44, 46, 48) providing control therefor as well as between each subprocess and the process control computer (44, 46, 48) providing redundant safety backup of the operational safety. One or more of the process control computer (44, 46, 48) in the distributed control system executes some preprogrammed set of instructions (50–62) as part of the preprogrammed set of instructions for which there are no inputs from field devices (76, 78, 80) or output control signals to field devices (76, 78, 80).

1 Claim, 4 Drawing Figures

DISTRIBUTED CONTROL WITH UNIVERSAL PROGRAM

BACKGROUND OF THE INVENTION

This invention relates to a method of controlling a plurality of subprocesses in a distributed control system and more particularly to a method of controlling a plurality of subprocesses in a distributed control system such that the preprogrammed set of instructions of each process control computer in the distributed control system is identical when the control function of each process control computer is not identical.

In a ring-type distributed control system such as disclosed in U.S. Pat. No. 4,015,548 each process control computer in the distributed process control system controls the associated subprocess, a coal pulverizer and elevation of fuel firing equipment. The same process control computer monitors the operation of the associated coal pulverizer and burner elevation equipment from a safety perspective. An adjacent process control computer also monitors the operation of the coal pulverizer and burner elevation from a safety perspective. Field inputs necessary to ascertain the status of safety equipment are wired to input ports of both the controlling process control computer and the process control computer providing redundant safety backup. Likewise, outputs necessary to control the subprocess are wired to the process control computer providing the control function; outputs necessary to shutdown the subprocess are wired to the process control computer providing redundant safety backup.

In the distributed process control system, the process control computer providing redundant safety backup has the ability to shutdown the coal pulverizer and burner elevation equipment that it is monitoring from a safety perspective. In an energized-to-start, energize-to-stop control system, a failure or otherwise removal from service of the processor providing control of its associated coal pulverizer and burner elevation does not remove the associated coal pulverizer and burner elevation from service. The associated coal pulverizer and burner elevation remain in service until an unsafe operating condition is approached at which time the adjacent processor monitoring the coal pulverizer and burner elevation from a safety perspective will safely shutdown the coal pulverizer and burner elevation utilizing the outputs connected thereto. However, the processor providing redundant safety backup does not have the ability to control the coal pulverizer and burner elevation, but rather only permits the coal pulverizer and burner elevation to remain in service at the status quo.

The distributed control system disclosed in U.S. Pat. No. 4,015,548 required in addition to process control computers (32-48) in the distributed process control system, two additional process control computers (50-52) to perform the unit function of monitoring the entire distributed control system and placing into service or removing from service subprocesses controlled by the distributed process control system such that the combined output from the subprocesses of the distributed process control system matched the demand therefor. Of the two process control computers performing the unit function in U.S. Pat. No. 4,015,548, one provided the unit function while the other served as a redundant backup.

What is needed is a method of controlling a plurality of subprocesses in a distributed control system that eliminates the separate process control computer dedicated to the unit function and a separate process control computer providing backup therefor. Such a method of controlling a plurality of subprocesses in a distributed control system would then leave only process control computers in the distributed process control system wherein each process control computer could execute the same preprogrammed set of instructions as all of the other process control computers in the distributed control system even though the control function of each process control computer is not identical. This design would necessitate maintaining only one spare program or one spare process control computer.

SUMMARY OF THE INVENTION

The present invention provides a method of controlling a plurality of subprocesses in a distributed control system wherein each of the process control computers executes a preprogrammed set of instructions that is identical to the preprogrammed set of instructions executed by each of the process control computers in the distributed control system. Each of the process control computers in the distributed control system is programmed with the same preprogrammed set of instructions. Field inputs and outputs are connected between each subprocess and the process control computer providing control therefor as well as between each subprocess and the process control computer providing redundant backup of the operational safety therefor. Each process control computer in performing its control function repeatedly executes a preprogrammed set of instructions identical to those preprogrammed in the other process control computers in the distributed control system. One or more of the process control computers in the distributed control system executes some preprogrammed instructions as part of the preprogrammed instructions for which there are no field inputs or field outputs.

DESCRIPTION OF THE PREFERRED EMBODIMENT

Figure 2:
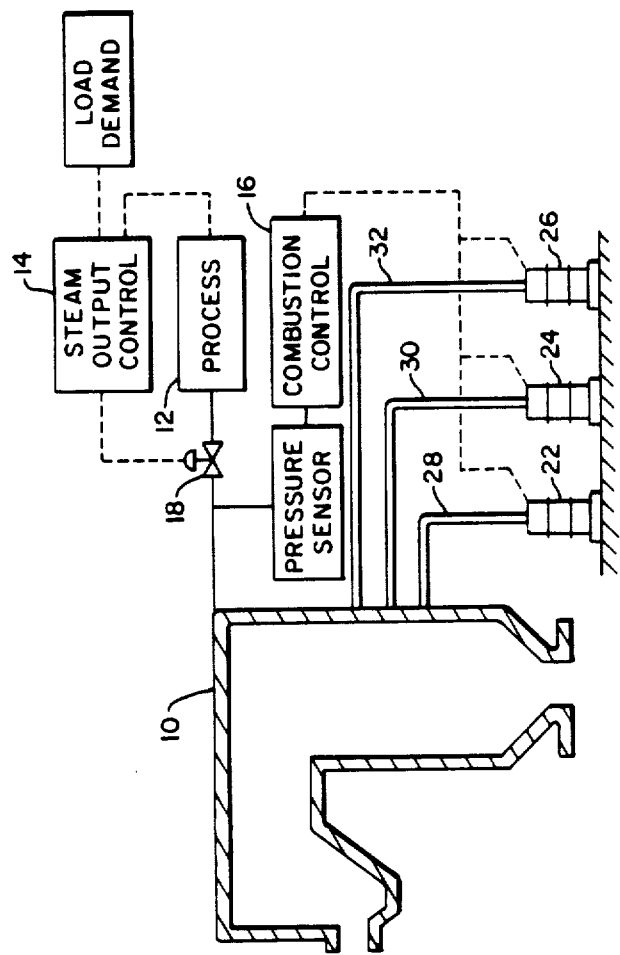
FIG. 2 is a diagrammatic representation of a process in which the present invention may be employed.

Referring to the drawing, initially to FIG. 2, furnace 10 is shown supplying steam to process 12. A steam output control system 14 and combustion control system 16 are utilized to control the steam flow from furnace 10 in response to changing load demands on process 12. Steam flow from furnace 10 is delivered to process 12 by vapor regulating valve 18 which in turn is controlled by steam output control system 14. Combustion control system 16 controls the flow of fluid to furnace 10 and also modulates the fuel input by controlling the flow of fuel oil or a plurality of pulverizing coal mills 22, 24 and 26 to meet the load demand requirements of process 12.

Figure 3:
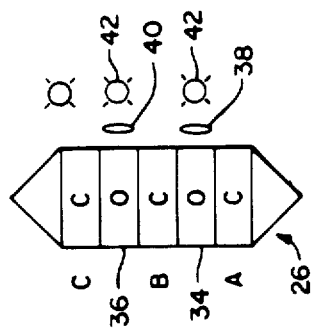
FIG. 3 is a schematic representation of a typical firing corner of the furnace depicted in FIG. 2.

The pulverizing coal mills supply pulverized coal to burner assemblies (not shown) typically arranged in elevations. Each elevation may include ignitors and burners disposed in each of the four corners of furnace 10 and adapted for tangential firing. A typical corner 29 containing three elevations of coal burners and two elevations of oil burners is shown in FIG. 3. Pulverizing coal mill 22 supplies a coal-air mixture to the burners of elevation A through coal supply line 28. Similarly, pulverizing coal mill 24 supplies a coal-air mixture to the burners of elevation B through coal supply line 30 and pulverizing coal mill 26 supplies a coal-air mixture to the burners of elevation C through coal supply line 32.

Corner 29 also includes two elevations of oil burners between adjacent coal elevations. An elevation of oil fired burners 34 is between coal elevations A and B; an elevation of oil fired burners 36 is between coal elevation B and C. The elevations of oil fired burners 34 and 36 are utilized to warm-up the furnace prior to startup of pulverizers 22-26, during low load operations to stabilize the fireball and to supplement or in place of coal as a fuel.

Each of the elevations of oil are typically ignited with a pilot ignitor to ignite oil entering furnace 10 through the associated burner elevation. Pilot ignitor 38 is associated with oil elevation 34 and pilot ignitor 40 is associated with oil elevation 36. As shown in FIG. 3, flame scanners 42 are disposed at appropriate positions to detect the presence or absence of flame.

Figure 1:
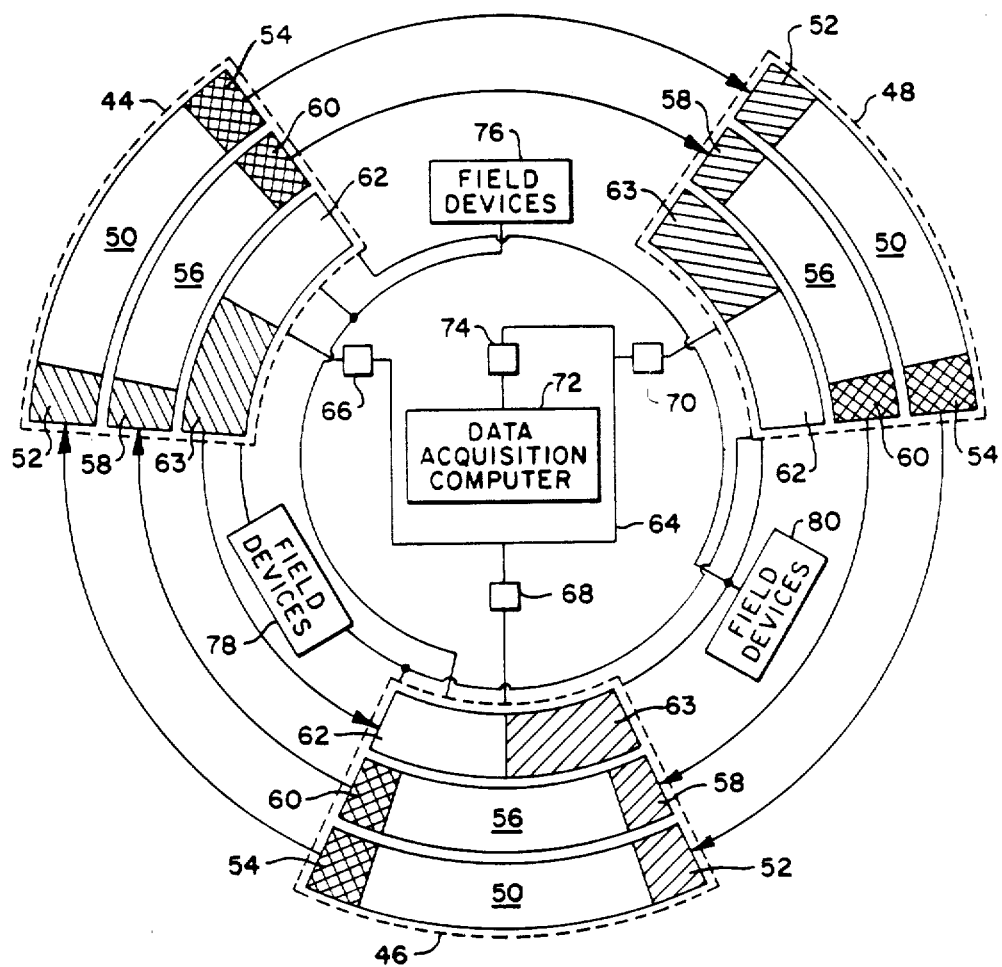
FIG. 1 is a schematic representation of a distributed control system incorporating a universal program in accordance with the present invention.

The coal supply system is disclosed in U.S. Pat. No. 3,395,657. The "ring"-type distributed control system controlling inter alia the coal supply system is disclosed in U.S. Pat. No. 4,015,548, which is hereby incorporated by reference. FIG. 1 shows a ring-type distributed control system incorporating a universal program of the present invention. As shown in FIG. 1, the distributed control system in the preferred embodiment is comprised of three process control computers, each controlling one or more subprocesses. In the preferred embodiment, the number of process control computers in the distributed control system corresponds in number to the number of subprocesses controlled with each process control computer controlling two subprocesses. The correspondence ratio may vary, for example, one, two, three or more subprocesses may be controlled by a single process control computer.

Figure 4:
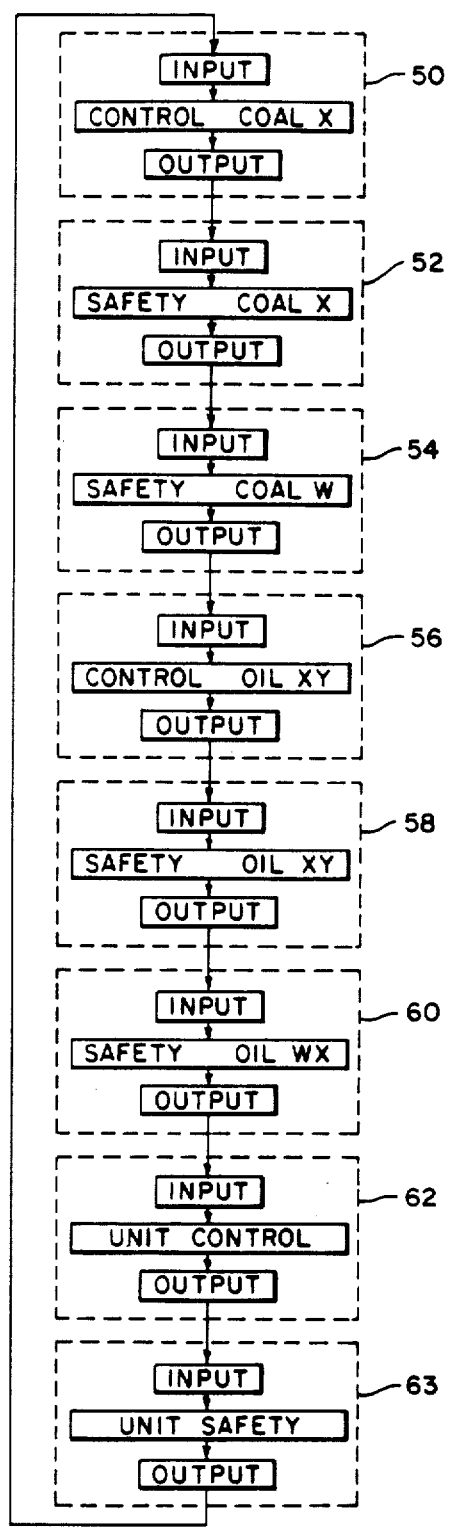
FIG. 4 is a logic diagram showing the implementation of a universal program within the distributed control system of FIG. 1.

The universal program for the preferred embodiment as programmed in each of process control computers 44, 46 and 48 is shown in FIG. 4. The universal program is programmed generically with the inputs and outputs connected to a specific process control computer 44-48 determining which subprocess is controlled by the respective process control computer and which process control computer provides redundant safety packup of for each subprocess. Each process control computer programmed with the universal program, in the preferred embodiment, controls a pulverizing coal mill X and associated burner elevation from a first portion of the memory of the typical process control computer. This is shown in FIG. 4 as logic 50. Logic 52 represents that a second portion of the memory of a typical process control computer is reserved to monitor the operation of pulverizing coal mill X and the associated burner elevation from a safety perspective. A third portion of the memory, logic 54, of the typical process control computer 44-48 is reserved to monitor from a safety perspective the operation of pulverizing coal mill W and the associated burner elevation which is controlled by another process control computer of process control computers 44-48, thereby serving as a redundant backup of the operational safety of the pulverizing coal mill and associated burner elevation controlled by a neighbor of process control computer in the distributed control system shown in FIG. 1.

Each process control computer of the distributed control system shown in FIG. 1 controls two subprocesses. Thus, the typical process control computer programmed with the universal program in addition to controlling pulverizing coal mill X and the associated burner elevation, also controls oil elevation XY in logic 56. Relative to control of the second subprocess, a second portion of the memory, in logic 58, of a typical process control computer programmed with the universal program is reserved to monitor the operation of oil elevation XY from a safety perspective. A third portion of the memory, logic 60, of a typical process control computer programmed with the universal program is reserved to monitor from a safety perspective the operation of an oil elevation not controlled by that process control computer. This is shown in logic 60 as a typical process control computer programmed with the universal program monitoring the safety of oil elevation WX, thereby serving as a redundant backup of the operational safety of oil elevation WX controlled by an adjacent process control computer in the distributed control system programmed with the universal program.

In logic 62, the universal program of a typical process control computer is shown as performing a unit control function. Logic 63 represents the operational safety of the unit function performed by logic 62. A second process control computer executing logic 63 within its universal program provides redundant backup for the unit control function.

FIG. 1 shows three process control computers 44, 46 and 48 interconnected by data highway 64. Process control computer 44 is interconnected with data highway 64 by modem 66. Similarly, process control computer 46 is interconnected with data highway by modem 68 and process control computer 48 is interconnected with data highway 64 by modem 70. Data acquisition computer 72 is interconnected to data highway 64 by modem 74. Field devices 76 representing pulverizer 22 and burner elevation A as well as oil elevation 34 and associated equipment is shown connected to each of process control computers 44 and 46. Field devices 76 are controlled by process control computer 44 with process control computer 46 monitoring field devices 76 from a safety perspective and also providing the unit function. Field devices 78 representing pulverizer 24 and burner elevation B as well as oil elevation 36 and associated equipment are shown interconnected to all three process control computers 44, 46 and 48. Field devices 78 are controlled by process control computer 46. Process control computer 46 further provides the unit function. Process control computer 48 monitors field devices 78 from a safety perspective; field devices 78 are interconnected to process control computer 44 as process control computer 44 provides the unit backup function.

Field devices 80 representing pulverizer 26 and burner elevation C are shown interconnected to all three process control computers 44, 46 and 48. Field devices 80 are controlled by process control computer 48. Process control computer 44 monitors field devices 80 from a safety perspective as a redundant backup to process control computer 48 and also performs the unit backup function. Field devices 80 are connected to process control computer 46 to provide inputs to and receive outputs from the unit function.

Applying the universal program to the application of process control computer 46, the variable X represents pulverizer 24 and elevation B, variable XY represents oil elevation 36 and associated equipment; W represents pulverizer 22, elevation A and associated equipment and variable WX represents oil elevation 34 and associated equipment.

Thus, process control computer 46 in logic 50 controls pulverizing coal mill 24 and burner elevation B. Process control computer 46 receives as input signals, denoted input within logic 50, the current status of field devices of pulverizing coal mill 24 and associated burner elevation B and generates in response thereto and in accordance with a preprogrammed set of instructions, denoted control coal X in logic 50, control signals, outputted through logic 50 denoted output, to control the associated pulverizing coal mill and elevation of burners. The input signals received by process control computer 46 for controlling pulverizer 24 and burner elevation B include such signals as pulverizer outlet temperature less than a specified maximum, lube oil level adequate, and no pulverizer trip. Process control computer 46 outputs control signals through logic 50 generated in response to the input operational parameters in accordance with the preprogrammed set of instructions. The output control signals may include cold air gate open, feeder inlet gate open, and feeder start command. Process control computer 46 monitors the operational safety of pulverizing coal mill 24 and associated burner elevation B by receiving input signals, denoted input in logic 52, of operational parameters of pulverizing coal mill 24 and associated burner elevation B, generating in response to the input operational parameters, in accordance with a preprogrammed set of instructions denoted safety coal X in logic 52, control signals outputted through logic 52 and denoted output to permit pulverizing coal mill 24 and associated burner elevation B to continue operation in the status quo or to shutdown if required.

Process control computer 46 also monitors the operational safety of a pulverizing coal mill and burner elevation controlled by another process control computer. Process control computer 46 serves as a redundant backup of pulverizing coal mill 22 and burner elevation A controlled by process control computer 44. Process control computer 46 receives in logic 54 as input signals denoted input of such operational parameters of pulverizer outlet temperature less than a specified maximum and pulverizer motor power, relating to pulverizing coal mill 22 and burner elevation A. Process control computer 44 executes a preprogrammed set of instructions denoted safety coal W in logic 54 and generates control signals, denoted output in logic 54, outputted as a redundant backup of the operational safety of pulverizing coal mill 22 and burner elevation A to permit pulverizing coal mill 22 and associated burner elevation A to continue operation in the status quo or to shutdown when the monitored operational parameters exceed a safe operating condition.

Similarly, the universal program provides for controlling an oil elevation and associated equipment, monitoring an oil elevation and associated equipment from a safety perspective, and monitoring from a safety perspective as a redundant backup an oil elevation and associated equipment controlled by another process control computer.

Process control computer 46 receives as input signals in logic 56 the current status of oil elevation 36 and associated equipment being controlled by process control computer 46. In response to the input signals and in accordance with a preprogrammed set of instructions denoted control oil XY in logic 56, process control computer 46 generates control signals denoted output in logic 56 to control oil elevation 36 and the associated equipment.

Process control computer 46 monitors the operational safety of oil elevation 36 and associated equipment by receiving input signals of operational parameters in logic 58 and generating in response to the input operational parameters in accordance with a preprogrammed set of instructions denoted safety oil XY in logic 58, control signals denoted outputs that are outputted to permit oil elevation 36 and associated equipment to operate in the status quo or to shutdown if required.

Process control computer 46 also monitors the operational safety of oil elevation 34 and associated equipment controlled by process control computer 44. Process control computer 46 serves as a redundant backup of the operational safety of oil elevation 34 and associated equipment controlled by process control computer 44. Process control computer 46 receives as input signals denoted input in logic 60 operational parameters indicative of the current operating status of oil elevation 34 and the associated equipment. In response thereto, process control computer 46 executes a preprogrammed set of instructions, denoted safety oil WX in logic 60, and generates control signals, denoted output in logic 60, outputted as redundant backup of the operational safety of oil elevation 34 and associated equipment to permit oil elevation 34 and the associated equipment to continue operation in the status quo or to shutdown when the monitored operational parameters exceed a safe operating condition. Thus, each process control computer 44-48 monitors the operational parameters of a second subprocess as a redundant backup of another of the process control computers, the second subprocess being controlled by a process control computer other than the process control computer providing the redundant backup. As a redundant backup process control computer monitoring the operational safety of a second subprocess, the process control computer monitors the same operational parameters of the second subprocess as it monitors of the subprocess it controls. Thus, if process control computer 44 controlling oil elevation 34 should fail or otherwise be removed from service, process control computer 46 permits oil elevation 34 to continue to operate in the status quo and can safely shutdown oil elevation 34 and associated equipment when an unsafe operating condition is approached.

Logic 62 provides the unit control function. Logic 62 monitors the operational status of pulverizing coal mills 22, 24 and 26 receiving input signals denoted input in logic 62 through input image registers of the operational status of each of the pulverizing mills such as whether each pulverizing mill is in operation and the loading thereon as well as parameters concerning furnace 10 and the load demand of process 12 such as drum level, negative pressure high, flame failure trip, low air flow, loss of fuel, induced draft fan off, forced draft fans off, cooling water flow adequate, start circulating pump command, stop circulating pump command, discharge valves open and no master fuel trip. Logic 62 generates in response to the operational status of pulverizing coal mill 24 and burner elevation A, pulverizing coal mill 30 and burner elevation B, pulverizing coal mill 26 and burner elevation C as well as oil elevation 34 and the associated equipment and oil elevation 36 and the associated equipment and further in accordance with the load demand on process 12, in accordance with a preprogrammed set of instructions denoted unit control in logic 62, control signals denoted output in logic 62, outputted through output image registers of process control computer 46 which are unit control signals to each of process control computers 44, 46 and 48 for varying the loading of each of the pulverizing coal mills and oil elevations to the extent that it places pulverizing coal mills and the corresponding elevation of burners or an oil elevation and the associated equipment in and out of service as a function of the load on process 12. Process control computer 44 in logic 62 also generates in response to the operational status of process 12 and in accordance with a preprogrammed set of instructions shutdown signals outputted through output image registers of process control computer 44 to shutdown furnace 10 when an unsafe operating condition is approached.

Logic 63 provides the unit safety function. Logic 63 receives as inputs the safety related inputs also received by logic 62 and monitors the operation of furnace 10 and the unit function performed by logic 62 from a safety perspective in accordance with a preprogrammed set of instructions denoted unit safety in FIG. 4. Should process control computer 46 fail, logic 63 in process control computer 44 permits furnace 10 and the subprocesses controlled by the distributed control system to continue to operate in the status quo. Should an unsafe operating condition be approached, logic 63 in process control computer 44 generates in accordance with the preprogrammed set of instructions shutdown signals, denoted output in logic 63, outputted through output image registers of process control computer 44 to shutdown furnace 10.

Process control computer 44 is programmed with the same universal program that process control computer 46 is programmed with. However, the control function is different. Process control computer 44 in logic 50 receives input signals from, controls in accordance with the preprogrammed set of instructions and provides output control signals to control pulverizing coal mill 22 and burner elevation A.

Process control computer 44 in logic 52 receives input signals from, monitors in accordance with the preprogrammed instructions and provides output control signals to control pulverizing coal mill 22 and burner elevation A from a safety perspective.

Process control computer 44 in logic 54 receives input signals from, monitors in accordance with the preprogrammed set of instructions and provides output control signals to control pulverizing coal mill 26 from a safety perspective as a redundant backup to process control computer 48.

Process control computer 44 in logic 56 receives input signals from, controls in accordance with the preprogrammed set of instructions and provides output control signals to control oil elevation 34 and associated equipment.

Process control computer 44 in logic 58 receives input signals from, monitors in accordance with the preprogrammed set of instructions and provides output control signals to control oil elevation 34 and associated equipment from a safety perspective.

Process control computer 44 has no inputs or outputs connected to logic 60. However, the preprogrammed set of instructions in logic 60 are executed each scan. With no field devices connected to the inputs or outputs of logic 60, this portion of the logic although executed each scan does not control any field devices; the inputs and outputs are thus said to float.

Process control computer 44 has no inputs or outputs connected to logic 62. Thus, although the preprogrammed set of instructions in logic 62 are executed each scan, the inputs and outputs thereto float.

Process control computer 44 in logic 63 receives input signals from each of the subprocesses being controlled and in accordance with the preprogrammed set of instructions denoted unit safety provides output control signals that provide a redundant backup to the unit safety function provided by logic 62 of process control computer 46. The same field inputs are provided to logic 63 of process control computer 44 as are provided to logic 63 of process control computer 46 such that upon failure or otherwise removal from service of process control computer 46 logic 63 of process control computer 44 has the current operating status of each of the subprocesses and is capable of assuming the unit safety function.

Process control computer 48 is programmed with the same universal program that process control computers 44 and 46 are programmed with. However, the control function is different. Process control computer 48 in logic 50 receives input signals from, controls in accordance with the preprogrammed set of instructions and provides output control signals to control pulverizing coal mill 26 and burner elevation C. Process control computer 48 in logic 52 receives input signals from, monitors from a safety perspective in accordance with the preprogrammed set of instructions and provides output control signals to control from a safety perspective pulverizing coal mill 26 and burner elevation C. Process control computer 48 in logic 54 receives input signals from pulverizing coal mill 24 and burner elevation B, monitors pulverizing coal mill 24 and burner elevation B in accordance with the preprogrammed set of instructions from a safety perspective as a redundant backup to process control computer 46, and provides output control signals to shutdown pulverizing coal mill 24 and burner elevation B upon pulverizing coal mill 24 or burner elevation B approaching an unsafe operating condition.

Process control computer 48 in logic 56 receives no input or output signals; the inputs and outputs of logic 56 of process control computer 48 float. Although logic 56 is executed each scan, since no field devices are connected thereto logic 56 of process control computer 48 does not control any hardware.

Process control computer 48 in logic 58 receives no input signals. Although logic 58 of process control computer 48 is executed each scan, logic 58 of process control computer 48 does not control any field devices. Thus, the inputs and outputs of logic 58 of process control computer 48 float.

Process control computer 48 in logic 60 receives input signals from oil elevation 36 and associated equipment and monitors oil elevation 36 and associated equipment from a safety perspective in accordance with a preprogrammed set of instructions as a redundant backup to process control computer 46 and provides output control signals to shutdown oil elevation 36 and associated equipment upon oil elevation 36 and associated equipment approaching an unsafe operating condition.

Process control computer 48 in logic 62 and 63 receives no input signals. Although the unit control and unit safety preprogrammed instructions are executed each scan, logic 62 and 63 of process control computer 48 does not control any field devices. Logic 62 and 63 of process control computer 48 may provide unit backup and unit safety functions as an alternative to logic 62 and 63 of process control computer 44.

Although the preferred embodiment has been disclosed utilizing three process control computers each controlling two subprocesses, the invention is not limited thereto. In accordance with the invention, each process control computer of a distributed control system executes a preprogrammed set of instructions identical to those preprogrammed in the other process control computers even though the control function of the process control computers may differ. Field inputs and outputs are connected between each subprocess and the process control computer providing control therefore as well as between each subprocess and process control computer providing redundant safety backup. In this manner, which subprocess a particular process control computer controls is determined by the input and output connections therebetween. If inputs and outputs to a particular portion of the preprogrammed set of instructions are not provided, the preprogrammed set of instructions are executed based upon the floating inputs and produce control signals provided to floating outputs thereby being executed each scan however not controlling any field devices.

I claim:

1. In a distributed control system for an industrial process unit having at least three subprocesses, each subprocess being subjected to both unit control and subprocess control, the unit control being dependent on a plurality of unit operating parameters and the subprocess control being dependent on a plurality of subprocess operating parameters, the control system having at least three process control computers corresponding in number to the number of said subprocesses, each process control computer having input ports for receiving operating input signals of operating parameters of an associated subprocess, a preprogrammed set of operating function instructions which are executed based upon the operating input signals and, which generate in response to the operating input signals in accordance with the programmed instructions, operating control signals outputted through output ports to control said associated subprocess, input ports for receiving safety input signals commensurate with the operational safety of said associated subprocess, a preprogrammed set of safety function instructions which are executed based upon the safety input signals and which generate in response thereto safety shutdown signals outputted through output ports for shutting down said associated subprocess when an unsafe operating condition is approached, input ports for receiving backup input signals commensurate with the operational safety of another subprocess, a preprogammed set of backup function instructions which are executed based upon the backup input signals and which generate in response thereto backup shutdown signals outputted through output ports to shut down said other subprocess when an unsafe operating condition is approached, whereby each of the plurality of process control computers serves as a redundant backup of the operational safety of another of the plurality of process control computers for each of the plurality of subprocesses, a method of unit and subprocess control comprising the steps of:

(a) storing an identical set of preprogrammed subprocess operating, safety and backup function instructions in each of said process control computers, said set including all preprogrammed instructions for accomplishing said subprocess control;

(b) storing identical set of preprogrammed unit operating, safety and backup control function instructions in each of said process control computers for accomplishing said unit control;

(c) interconnecting each of said process computers with,
  (1) at least two other of said computers for generating operating, safety, or backup control signals for at least two subprocesses, and
  (2) at least two of said subprocesses for receiving input signals and sending output signals through said input and output ports to control said at least two subprocesses;

(d) interconnecting at least two of said computers to a source of input data including said unit operating parameters;

(e) repeatedly executing said subprocess and unit sets of instructions in each of the process control computers whether or not input signals are received from or output signals are received by another process computer, a subprocess, or said source of input data;

(f) controlling the unit and each subprocess utilizing only the signals transmitted between said interconnected computers, subprocesses, and source of input data recited in step (e) above.

* * * * *